Oct. 22, 1957  A. V. RICHARDS ET AL  2,810,309
LUBRICATING DEVICE FOR UNIVERSAL DRILL PRESS
Filed July 10, 1956  2 Sheets-Sheet 1
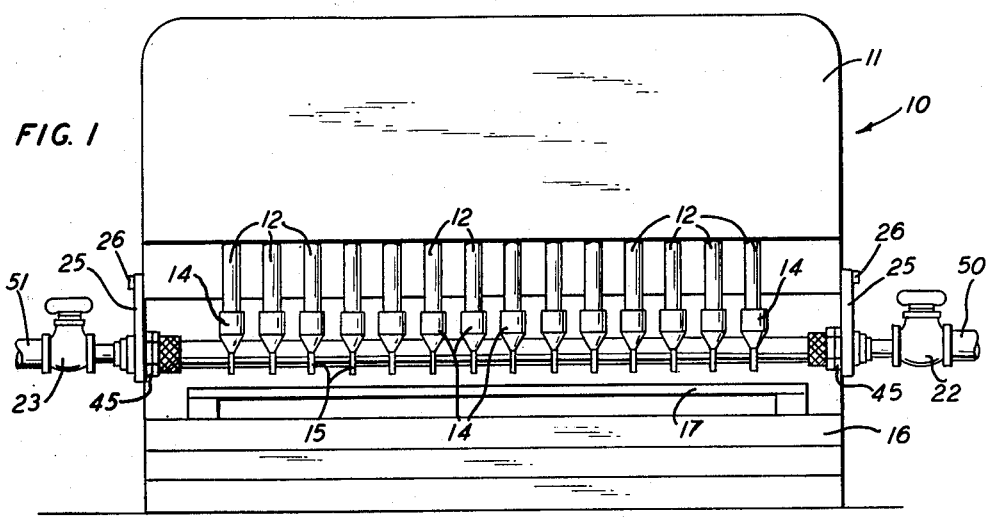
FIG. 1
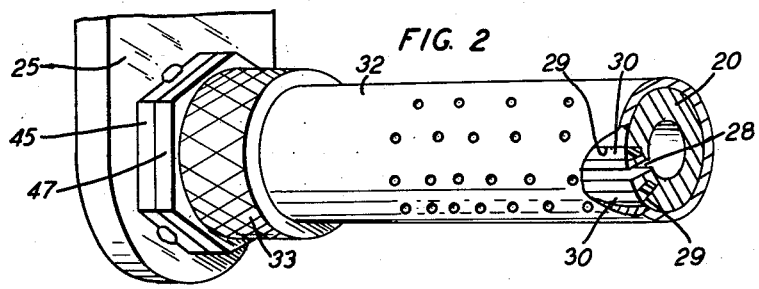
FIG. 2
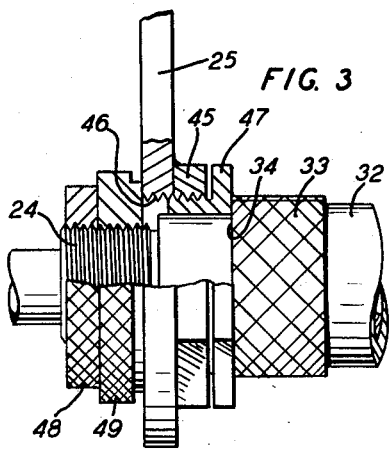
FIG. 3
INVENTORS
A. V. RICHARDS
H. W. SCHAUFELBERGER
BY
ATTORNEY Oct. 22, 1957   A. V. RICHARDS ET AL   2,810,309
LUBRICATING DEVICE FOR UNIVERSAL DRILL PRESS
Filed July 10, 1956   2 Sheets-Sheet 2
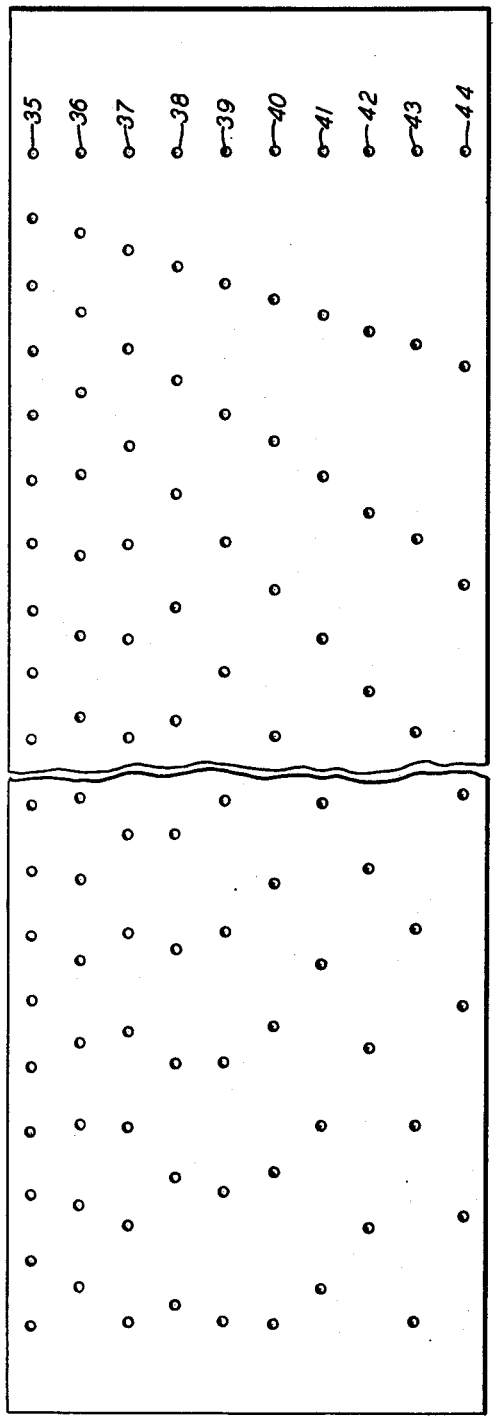
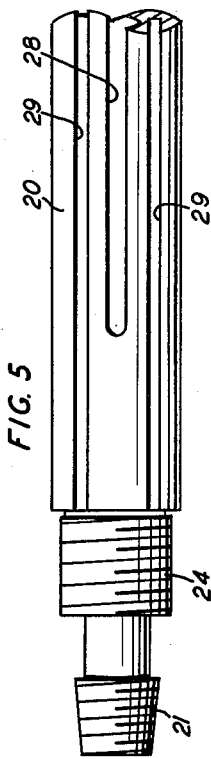
INVENTORS
A. V. RICHARDS
H. W. SCHAUFELBERGER
BY
ATTORNEY

2,810,309
LUBRICATING DEVICE FOR UNIVERSAL DRILL PRESS

Alfred V. Richards, North Arlington, and Henry W. Schaufelberger, Union, N. J., assignors to Western Electric Company, Incorporated, New York, N. Y., a corporation of New York Application July 10, 1956, Serial No. 596,978

3 Claims. (Cl. 77—55)

This invention relates to lubricating devices particularly for universal drill presses.

Commercially known universal drill presses have driving means in the heads thereof to which varied numbers of tool supporting spindles may be attached operatively at varied spaced positions. In some instances it is possible for ten different arrangements or sets of the spindles wherein the spindles may vary in number and also in group spacing relative to each other, however, the spindles and the tools which they support in their chucks, are equally spaced in each set. For this reason, the lubricating problem is difficult where it is necessary to apply a suitable quantity of lubricant to each tool, whether it be a drilling, boring, reaming or tapping tool, without the necessity of flooding the area in which the tools are disposed.

The object of the invention is a lubricating device, particularly adapted for universal drill presses and readily adjustable for lubricating selectively variable positions for tools.

In one embodiment of the invention according to the object, the lubricating device comprises an inner tubular member connected with a lubricant under pressure and provided with an elongate slot directed toward the area of the tools of a multiple drill press and having a sleeve rotatably mounted thereon and provided with sets of aligned variedly spaced apertures corresponding to the spacings of the set of spindles of the drill press for selective movement into registration with the slot to direct jets of the lubricant directly toward the tools. The tubular member is mounted at spaced positions in supports carried by the drill press and has longitudinal grooves upon each side of the slot to receive members to engage the sleeves to provide fluid seals against the escapement of the lubricant other than through the apertures of the sleeve registered with the slot.

Other objects and advantages will be apparent from the following detailed description when considered in conjunction with the accompanying drawings, wherein:

Fig. 1 is a front elevational view of a universal drill press embodying the invention;

Fig. 2 is a fragmentary isometric view of a portion of the lubricating device;

Fig. 3 is a fragmentary detailed view of the end structure and mounting means of the device;

Fig. 4 is a developed view of the sleeve illustrating the various groups or sets of apertures therein and, Fig. 5 is a fragmentary detailed view of a portion of the tubular member.

Referring now to the drawings, attention is directed to Fig. 1 which illustrates a conventional universal drill press 10 having a head 11 wherein the conventional driving means is disposed as well as the supporting means for any desired number of spindles 12 having chucks 14 for receiving and supporting tools 15. The tools 15 may be of the conventional type of drills, boring tools, reamers or taps. The press 10 has a conventional work support 16 movable vertically relative to the tools to move work 17 relative to the tools to bring about drilling, boring reaming or tapping operations on the work.

In Fig. 1, one set of spindles 12 with their chucks 14 and tools 15 are illustrated. However, in the present embodiment of the invention there may be ten sets of spindles 12 which may vary in number and spacing depending upon the operations to be performed on the work. The number of spindles for each set is known as well as the distances of the spindles from each other or the axes of the tools from each other.

The lubricating device includes a tubular element 20 having the general structure as shown in Fig. 5 with outer threaded portions 21 for the mounting of valves 22 and 23 respectively thereon and inner threaded members 24 for use in mounting the tubular member in apertured supports 25 mounted at 26 at each end of the press 10. The tubular member 20 has an enlongated slot 28 therein, terminating short of its ends, and also parallel grooves 29 disposed upon each side of the slot 28 to receive members 30 which tend to overflow the grooves to serve as fluid seals against the inner surface of a sleeve 32. The sleeve 32 is shorter than the main portion of the tubular element 20 and is provided with enlarged knurled portions 33 at each end 34 thereof. The sleeve 32 is provided with a plurality of sets of apertures 35, 36, 37, 38, 39, 40, 41, 42, 43 and 44, the apertures in each set being spaced known distances corresponding to the distances of the axes of the spindles 12 in each set to be mounted selectively in the head of the universal drill press. The spacing of these apertures 35 to 44 inclusive are illustrated in Fig. 4, the apertures in each set being in general alignment with each other so that when moved into registration with the slot, the jets of lubricant forced through the apertures will be directed toward their respective tools 15.

The mounting means shown in Fig. 3 includes a nut 45 fixed to the inner surface of each support 25 by suitable means, such as welding, so that the internal threads of the nut 45 will corrsepond with and serve as a continuation of threads 46 in the aperture of each support 25. Externally threaded elements 47 are threadedly disposed in the nut 45 and the aperture 46 at each end of the device to support the ends of the tubular element 20 adjacent the threaded portions 24 and to cooperate in locking the sleeve 32 in any adjusted position. Nuts 48 and 49 with knurled outer surfaces are mounted upon the threaded portion 24 at each end of the tubular member for movement into locking engagement with their respective support 25 to lock the tubular element with the slot 28 in any desired position to direct a supply of lubricant toward the tools 15.

The valve 22 is connected to a fluid line 50, which may be considered as the supply of lubricant under pressure to direct the lubricant through the valve 22 when opened and into the tubular element 20. The valve 23 may be closed if the lubricant is supplied only to the press shown but if the lubricant is to continue on to other presses it may do so through line 51. Also line 51 may be employed as the drain for cleaning the device. After the universal drill press 10 has been conditioned or changed to receive another set of spindles 12 and tools 15, the lubricating device may be adjusted readily by loosening one of the externally threaded elements 47 to free the holding action on the sleeve after which the operator, through the aid of the knurled ends 33, may rotate the sleeve 32 on the tubular element 20 until the set of apertures 35 to 44 inclusive, which corresponds to the new set of spindles, is moved into registration with the slot 28. The loosened element 47 may be tightened and the valve 22 opened making the device ready for service in directing individual streams of lubricant directly toward and onto their respective tools 15. The externally threaded elements 47 are loosened singly preferably due to the fact that they jointly serve initially to set the sleeve longitudinally of the tubular element 20 to position the sleeve for accurate location of its sets of apertures for registration with the tools with their respective sets of spindles. After this adjustment has been made, the loosening of only one element 47 will permit rotation of the sleeve, to bring any desired set of apertures into registration with the slot 28, and will assure accurate location of the sleeve when moved into close engagement with its adjacent end 34 of the sleeve to hold the sleeve against rotation.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A lubricating device for a universal drill press wherein varied numbers of driven spindles, having chucks for supporting tools, may be mounted in sets with their axes disposed in a given plane, and varying in known numbers of spindles for each set and known spacings of the spindles from each other in each set, the lubricating device comprising a tubular element mounted parallel with the plane adjacent the tools and having an elongate slot therein to direct a lubricant toward the tools, means to connect the element to a supply of lubricant under pressure, and a sleeve having spaced rows of apertures therein the numbers and spacings of which correspond to the numbers and spacings of the spindles in the sets, and rotatably mounted on the element for movement of any selected row of apertures in registration with the slot to direct individual streams of the lubricant to the tools.

2. A lubricating device for a universal drill press wherein varied numbers of driven spindles, having chucks for supporting tools, may be mounted in sets with their axes disposed in a given plane, and varying in known numbers of spindles for each set and known spacings of the spindles from each other in each set, the lubricating device comprising a tubular element mounted parallel with the plane adjacent the tools and having an elongate slot therein to direct a lubricant toward the tools, means to connect the element to a supply of lubricant under pressure, and a sleeve having spaced rows of apertures therein the numbers and spacings of which correspond to the numbers and spacings of the spindles in the sets, rotatably mounted on the element for movement of any selected row of apertures in registration with the slot to direct individual streams of the lubricant to the tools, supports for the element and sleeve, and means to lock the sleeve in any selected position on the element.

3. A lubricating device for a universal drill press wherein varied numbers of driven spindles, having chucks for supporting tools, may be mounted in sets with their axes disposed in a given plane, and varying in known numbers of spindles for each set and known spacings of the spindles from each other in each set, the lubricating device comprising a tubular element mounted parallel with the plane adjacent the tools and having an elongate slot therein to direct a lubricant toward the tools, means to connect the element to a supply of lubricant under pressure, and a sleeve having spaced rows of apertures therein the numbers and spacings of which correspond to the numbers and spacings of the spindles in the sets, rotatably mounted on the element for movement of any selected row of apertures in registration with the slot to direct individual streams of the lubricant to the tools, the tubular element having longitudinal grooves therein upon each side of the slot, and members disposed in the grooves and engaging the inner surface of the sleeve to form a fluid seal adjacent the slot.

No references cited.